United States Patent [19]
Pörsch

[11] 3,951,758
[45] Apr. 20, 1976

[54] METHOD OF OPERATING A PURIFYING PLANT AND TANK FOR PRACTICING SAID METHOD

[75] Inventor: Rudolf Pörsch, Altbach, Germany

[73] Assignee: Menzel & Company, Stuttgart, Germany

[22] Filed: July 17, 1974

[21] Appl. No.: 489,153

[52] U.S. Cl. .................................. 210/14; 210/15; 210/219; 210/220
[51] Int. Cl.² .................................... C02C 1/12
[58] Field of Search .............. 210/14, 15, 63, 219, 210/220, 221; 261/36, 122, 124

[56] References Cited
UNITED STATES PATENTS

| | | | |
|---|---|---|---|
| 3,220,706 | 11/1965 | Valdespino | 210/14 X |
| 3,271,304 | 9/1966 | Valdespino et al. | 210/14 X |
| 3,336,016 | 8/1967 | Schreiber | 210/14 X |
| 3,495,712 | 2/1970 | Schreiber | 210/14 X |
| 3,573,203 | 3/1971 | Kaelin | 210/14 |

FOREIGN PATENTS OR APPLICATIONS

| | | | |
|---|---|---|---|
| 1,932,640 | 2/1971 | Germany | 210/15 |
| 970,470 | 9/1964 | United Kingdom | 210/14 |

*Primary Examiner*—Charles N. Hart
*Assistant Examiner*—Robert H. Spitzer
*Attorney, Agent, or Firm*—Walter Becker

[57] ABSTRACT

A method for operating an at least approximately round reactivating tank with a vertical axis for a purifying plant, according to which the sludge-water mixture to be purified is revolved in the tank and compressed air is introduced into the mixture to supply the reactivating sludge flakes of the sludge-water mixture in the tank with oxygen whereupon the mixture in the tank is forced to carry out and to maintain for a desired time a circular flow of the mixture to be purified which flow is substantially coaxial with the vertical axis of the tank. The invention also includes a reactivating tank for purifying a sludge-water mixture therein which tank has arranged therein adjacent the outer wall thereof turbine means having the axis thereof extending parallel to a tangent to the outer wall of the tank which outer wall is at least approximately round.

5 Claims, 2 Drawing Figures

METHOD OF OPERATING A PURIFYING PLANT AND TANK FOR PRACTICING SAID METHOD

The present invention relates to a method of operating a reactivating tank for a purifying plant with mechanical circulation of the sludge-water mixture and with compressed air ventilation independent of the said circulation for supplying the activated sludge flakes with oxygen, said tank being designed as an at least approximately round container, for instance a cylindrical container or a polygonal container.

Round and rectangular containers have become known in which by means of a surface ventilator, especially a gyroscope, it has been attempted to completely mix the content of such tank. Surface ventilators of this type are, however, not able over long periods of ventilation to meet the requirements which have to be met with an economically operating oxygen supply system in which the sludge-water mixture is mechanically circulated. This is due to the operating mechanism of such ventilators which are designed for an optimum oxygen supply but are not designed for an economic circulation of the sludge-water mixture. In view of the interdependent relationship of oxygen supply and mechanical circulation or revolution, such ventilators cannot economically be employed with ventilating systems working over a longer period of time.

In the "Working Report A27, November, 1962" of the Research Institute of Public Health Engineering T.N.O., A. Pas Veer and S. Sweeris persented their tests and the results thereof concerning a new development in the compressed air ventilation. In the said report the following findings were stated:

In a circulating or revolving tank with compressed air ventilation, the sludge-water mixture is due to the compressed air lifting effect on the ascending air bubbles accelerated so that a kind of a rolling movement of the content of the tank is generated. The ascending velocity of the water within the region of the air feeding is in this instance approximately from two to three times as high as the ascending speed of the air bubbles in still water.

The ascending speed of an air bubble with the diameter of from 1–5 mm amounts in still water to from 20–30 centimeters per second. In the revolving or circulating tank, however, the ascending speed of such air bubbles amounts to approximately from 1 to 1.30 meters per second. As the result thereof, the contact period of the air with the waste water is reduced to from one-third to one-fourth whereby the introduction of oxygen cannot reach optimum values. With a reactivating tank with a horizontally flowing liquid mixture of waste water and reactivated sludge, the contact period of the air bubble with the liquid is solely dependent on the ascending speed of the air bubble and the height of the water column.

Aeration or ventilating installations operating over a longer period of time have become known, in which the introduction of oxygen is effected through the intervention of a surface ventilator (roller) which is mounted on a circulating bridge. With other aerating or ventilating installations operating for a longer period of time, a pipe turbine (Rohrturbine) has been provided for mechanically revolving the mixture. The introduction of oxygen is effected through the intervention of a jet ventilator which imparts upon the plant the character of an oxidation ditch.

Ventilating installations working for a longer period of time have become known in which on a circulating bridge, compressed air ventilators are moved which bring about a ventilation and mechanical revolving or circulation of the mixture. Also with this type of ventilating plant is, similar to the above mentioned plants, provided an outwardly located reactivating chamber and an inwardly located settling tank.

In view of these heretofore known purifying plants which, due to their compact construction and structure involve high manufacturing costs, it is an object of the present invention to find an economically better solution which will permit a simpler construction of the tank and a more favorable energy consumption even with purifying plants working over a longer period of time.

These and other objects and advantages of the invention will appear more clearly from the following specification in connection with the accompanying drawing, in which.

Figure 1:
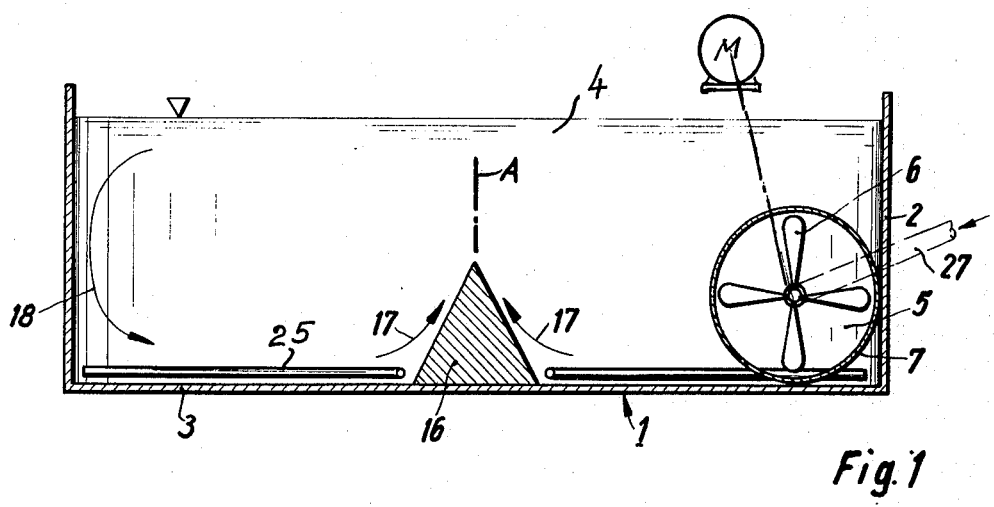
FIG. 1 illustrates a vertical diametrical section through a mixing tank according to the present invention.
Figure 2:
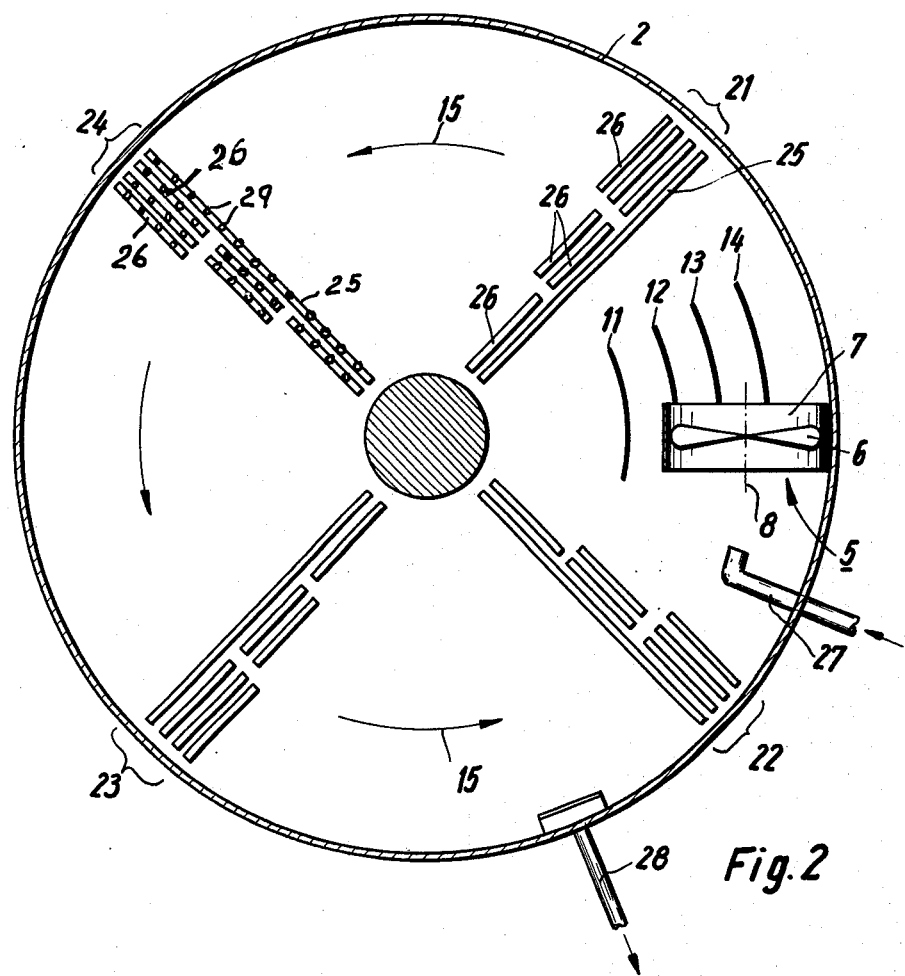
FIG. 2 is a top view of the device shown in FIG. 1.

The method for operating an at least approximately round reactivating tank with a vertical axis for a purifying plant is, according to the present invention characterized primarily by the steps of revolving in said tank the sludge-water mixture to be purified, supplying the reactivating sludge flakes of the sludge-water mixture in said tank with oxygen by introducing compressed air into said mixture and forcing said mixture in said tank to carry out and to maintain for a desired time a circular flow of said mixture to be purified, said flow being substantially coaxial with said vertical axis. If in a polygonal at least approximately cylindrical container or tank a circular flow is forced around the vertical axis of the container or tank, the water level rises from the tank axis toward the tank rim. In the outer zones which is located in the immediate vicinity of the tank rim, a relative overpressure is generated which brings about a transverse flow along the tank bottom in the direction toward the tank axis. This results not only in a circular flow of the sludge-water mixture which is coaxial with the tank axis, but also a roller-type movement occurs which is superimposed upon said circular flow and by means of which a mixing through of the sludge-water mixture is considerably aided. Due to the preferably horizontally flowing mixture fluid of waste water and reactivating sludge, the contact period of the air bubbles with the fluid is dependent solely from the ascending speed of the air bubbles and the height of the water column whereby optimum oxidation is obtained.

According to a further development of the method according to the invention, it is suggested that the transverse flow generated as the result of the circular flow and directed toward the tank axis which transverse flow occurs along the preferably horizontally oriented tank bottom, is in the vicinity of the tank axis deviated so that it flows upwardly. As a result thereof, a three-dimensional flow is obtained which brings about an intensive mixing through of the sludge-water mixture. Due to the installation of a flow-control cone which tapers in upward direction and is coaxially arranged with regard to the tank axis, a considerable reduction in energy losses of the transverse flow can be realized.

The circular and transverse flow aimed at by the method according to the present invention can be realized in the reactivating tank in the form of a round tank, for instance by means of an agitating mechanism which is connected to a bridge and is equipped with a cap immersing into said mixture or may be generated by injectors or by circulating pumps. As a most economic solution, it is suggested according to a further development of the invention that for the circulating flow in the reactivating tank there is employed a turbine, especially a pipe turbine, which serves for maintaining the circular flow and at least partially immerses into the sludge-water mixture. A pipe turbine is considered a particularly advantageous solution.

According to a further development of the invention, it is suggested that the introduction of oxygen is effected by means of at least one compressed air ventilator which is located slightly above the preferably circular tank bottom.

According to a ventilating tank which is especially suitable for practicing the method according to the invention, it is, in conformity with a further development of the invention suggested that the axis of the turbine bringing about the circular flow extends tangentially with regard to the wall of the tank. For the operation of a long period ventilating tank according to the invention it is particularly advantageous when for purposes of lowering the cost of the operation, the axis of the turbine is located near the wall of the tank.

Experience also has proved that the effect of the introduction of oxygen at the relative optimum can be realized when the quantity of oxygen introduced per time unit increases at least approximately with the sludge-water mixture volume increasing toward the outer diameter of the reactivating tank. Based on this finding, it is suggested that according to a still further development of the invention, the exit cross section for the compressed air to be introduced increases from the axis of the tank toward the tank wall. For introducing oxygen advantageously, one, expediently at least two, compressed air ventilators are provided which extend radially with regard to the vertical axis of the tank.

It is possible to realize that the introduction of oxygen increases from the axis of the tank toward the wall of the tank by so designing the exit openings for the compressed air that these exit openings increase in size the closer they are to the tank rim and/or by having the distance between said exit openings decrease the closer they are to the rim of the tank. A particularly simple arrangement is obtained when a plurality of compressed air containers are provided the number of which increases with increasing distance from the axis of the tank. In this instance, the ventilators may have exit openings for the compressed air which are of the same size for all of the ventilators and which are evenly spaced from each other. According to a further development of the invention, it is provided that from the axis in radial direction toward the wall of the tank there extend at least two groups of pressure pipes of which each group contains at least two compressed air ventilators which both extend close to the wall of the tank but have a different length.

The design of the desired roller-like transverse flow which is superimposed upon the circular flow may be considerably aided when according to a further development of the invention there is provided an upwardly tapered flow deviating cone which is coaxial with the tank axis. By means of such a cone, the transverse flow which forms in the vicinity of the tank bottom and is directed toward the axis of the tank and which is created by the increased pressure in the vicinity of the rim of the tank can be deviated so as to flow upwardly.

Referring now to the drawing in detail, the circular flow mixing tank illustrated therein serves for operating a purifying plant (not illustrated in detail) and includes a mechanical revolution or circulation of the sludge-water mixture introduced into the round container 1 for purifying said mixture. The round container 1 has a cylindrical tank wall 2 and a substantially plane horizontally extending tank bottom 3. In order to generate a circular flow of the sludge-water mixture 4 in the tank, which circular flow should be coaxial with the vertical axis A of the tank and to maintain such flow over a longer period of time, a pipe turbine 5 is provided in the direct vicinity of the tank wall 2. The propeller 6 of said turbine 5 is driven by an electric motor and is built into a cylindrical pipe section 7. This pipe section 7 has, for instance, a diameter of approximately three meters. The axis 8 of rotation of the propeller 6 which axis 8 is coaxially arranged with the pipe section 7 extends in the illustrated manner parallel to a tangent to the tank wall 2. The turbine 5 rotates at a very low speed of from 15 to 35 revolutions per minute. The raw waste water is introduced through a siphon conduit 27 (Dükerleitung) in flow direction into the activating tank, said conduit 27 ending in front of the turbine 5. In this way, it is possible within a short period within the region of the turbine to obtain a practically complete mixture of the raw waste water with the sludge-water mixture. After passing through an angle at the center of approximately 300°, the biologically refined waste water may through an overflow pipe 28 (Überlaufschwelle) be withdrawn from the reactivating tank and be conveyed to a place for further processing. When viewing in the direction of thrust, behind the turbine 5 there are provided guiding walls 11, 12, 13 and 14 which aid the formation of the circular flow indicated by the arrows 15 and simultaneously act counter to the formation of turbulence behind the propeller hub. At the same time, the flow losses are reduced by said guiding walls. Since, furthermore, the turbulence losses occurring on the propeller blades 6 are reduced to a considerable extent by the pipe section 7, the circular flow can be maintained by a minimum of energy.

In view of the circular flow, a mass pressure occurs at that annular zone which is directly adjacent to the tank wall 2, which mass pressure is slightly higher than that in the vicinity of the axis A. This overpressure brings about that a transverse flow is generated which extends along the tank bottom 3 and is directed toward the tank axis A. This transverse flow is deviated by a flow-deviating cone 16 arranged coaxially with regard to the tank axis A, so that an ascending flow is formed as indicated by the arrows 17. As a result thereof, a roller-shaped movement is formed as indicated by an arrow 18, which movement is superimposed upon the circular flow 15 and aids the introduction of oxygen.

For purposes of introducing oxygen into the sludge-water mixture, four groups 21 – 24 of compressed air ventilators are provided which extend substantially radially and which groups are uniformly distributed over the circumference of the tank. Each of these pipe and ventilator groups comprises a compressed air pipe 25 which extends from the deviating cone 16 to an area close to the tank rim. The pipe 25 has associated therewith a plurality of parallel compressed air ventilators 26 which are likewise arranged closely above the tank bottom 3, whereas in the direct vicinity of the deviating cone 16 only one such compressed air ventilator 26 is associated with a compressed air pipe 25 and with the latter is by a common connecting piece connected to a non-illustrated supply conduit; in the medium annular zone of the tank there are provided two compressed air ventilators 26, and at the marginal zone of the tank there are provided even three compressed air ventilators 26.

Each of the compressed air ventilators 26 comprises a number of exit openings 29 for the compressed air which exit openings are uniformly distributed over the pipe length. In this way, an introduction of a quantity of air is obtained which similar to the flow velocity of the reactivated sludge decreases from the axis A toward the rim of the tank.

In view of the forced circular flow 15 and the revolving or circulating movement 18 superimposed therein, a very favorable introduction of oxygen is obtained while the ventilation can in an optimum economical manner be adapted to the varying requirement of oxygen of the reactivated sludge flake.

The economy of the ventilation may additionally be increased by conveying compressed air to the ventilating pipes 25, 26 and 27 at different pressure or by admitting compressed air only intermittently.

In addition to the above, it is possible by suitable measuring, metering and control devices to control the introduction of oxygen during continuous operation as well as during intermittent operation so as to keep the same at the lower limit while the introduction of oxygen can always be adapted in an optimum way to the actual requirement. Such possibility of adapting the introduction of oxygen by means of measuring, metering and control devices, is for the first years of operation of a communal purification plant of particular importance because as a rule such plants are usually designed for the requirements to be met in the future so that at the start of their operation they are as a rule overdimensioned and thus operated below the intended load.

Due to the controlled introduction of oxygen at the lower requirement limit further operational advantages are obtained such as better sludge properties, i.e. a more favorable sedimentation behavior, nitrification and de-nitrification of the reactivated sludge flakes whereby effects of a third purifying stage may be realized. Due to the periodically increased anaerobic zone in the reactivated sludge flake, especially with intermittent ventilation, a periodic occurrence of briefly anaerobic "broken-up" material may occur which cannot be broken up by exclusively aerobic treatment. In the first portion of the reinforced aerating phase, especially however, with intermittent aeration, a better exploitation of the oxygen from the air introduced into the sludge-water mixture is obtained whereby an economy is obtained which is considerably better than that realized by Pasveer and Sweeris. In view of the method and the aeration tank according to the present invention, not only an optimum introduction of oxygen but also an intensive intermixture of the sludge-water mixture is obtained whereby an optimum buffering of poison shocks (Giftstössen) or high $BSB_5$ admission concentration and accordingly a biochemical oxygen requirement can be realized within 5 days.

It is, of course, to be understood that the present invention is not limited to the specific showing in the drawing, but also comprises any modifications within the scope of the appended claims.

What I claim is:

1. A method of operating an at least approximately round reactivating tank for a purifying plant, said tank having a vertical axis and being adapted to receive a sludge-water mixture to be purified, which includes in combination the steps of: revolving in said tank the sludge-water mixture to be purified, supplying the reactivating sludge flakes of the sludge-water mixture in the tank with oxygen independently of revolving by introducing compressed air into said mixture along radial lines from adjacent the outer circumference inwardly toward the center, and increasing the volume of air outwardly from the center toward the circumference, and forcing said mixture in said tank to carry out and to maintain for a desired time a circular flow of said mixture to be purified, said flow being substantially coaxial with said vertical axis and having a radially inwardly directed component adjacent the bottom of said tank, and deflecting upwardly by centrally positioned inclined surface means said inwardly flowing mixture from said bottom as it moves toward the axis of said tank.

2. A reactivating tank with substantially vertical axis for purifying a sludge-water mixture adapted to be received revolving independently in said tank, which includes in combination: a bottom, an at least approximately round outer wall at least nearly uniformly spaced from said axis and confining said bottom, and means arranged in said tank adjacent said outer wall to circulate said mixture circumferentially in said tank, to produce a radially inwardly directed component of said flow, an upwardly tapering deflecting member positioned centrally on the bottom of the tank having upwardly converging surface means to deflect the inwardly directed flow upwardly, and a plurality of compressed air ventilator means extending radially outwardly adjacent the bottom of said tank, said ventilator means including outlet means increasing in total cross section radially outwardly toward said outer wall.

3. A tank in combination according to claim 2, in which each of said compressed air ventilator means includes a plurality of compressed air ventilators the number of which increases with the increase in the radial distance between said ventilators and said substantially vertical tank axis.

4. A tank in combination according to claim 3, in which said ventilator means include at least two groups of ventilators, each of said groups comprising two ventilators of different length extending close to said outer tank wall.

5. A tank in combination according to claim 4, in which the number of ventilators pertaining to one and the same group of ventilators increases with increasing distance from said tank axis.

* * * * *